Figure 1:
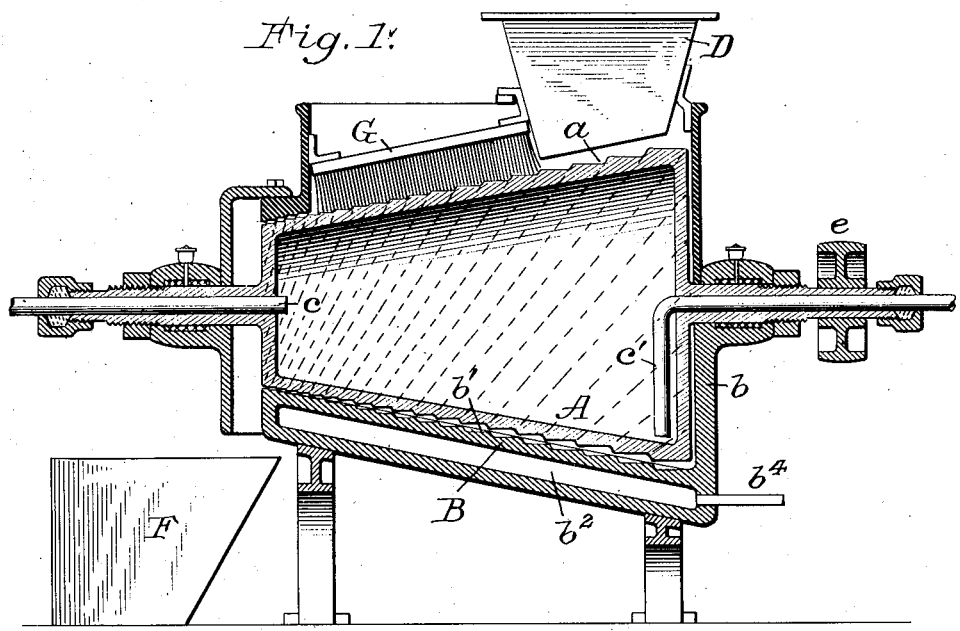

No. 834,516. PATENTED OCT. 30, 1906.
L. GATHMANN.
PROCESS OF REDUCING MILK TO A DRY POWDER.
APPLICATION FILED OCT. 18, 1904.

Attest:
C. W. Fowler
A. C. Powell

Inventor:
Louis Gathmann,
By Nowell Butler
Attorney.

UNITED STATES PATENT OFFICE.

LOUIS GATHMANN, OF WASHINGTON, DISTRICT OF COLUMBIA, ASSIGNOR OF ONE-HALF TO MELVILLE E. DAYTON AND HOWELL BARTLE, OF WASHINGTON, DISTRICT OF COLUMBIA.

PROCESS OF REDUCING MILK TO A DRY POWDER.

No. 834,516.     Specification of Letters Patent.     Patented Oct. 30, 1906.

Application filed October 18, 1904. Serial No. 228,956.

*To all whom it may concern:*

Be it known that I, LOUIS GATHMANN, a citizen of the United States, residing at Washington, in the District of Columbia, have invented a new and useful Process of Reducing Milk to a Dry Powder, of which the following is a specification.

My invention relates to a process of reducing milk to a dry powdered form by evaporating the water therefrom for the purpose of preserving the solid constituents in a dry and practically-unchanged condition, so that by the addition of water thereto the complete or substantially complete milk may be reproduced.

It has heretofore been proposed to evaporate the water from milk by feeding the milk in a thin film upon a rotating steam-heated cylinder, from which the dried or partially-dried product is to be removed by a suitable scraper. In the practical operation of this method it has been found that the film becomes hard or glazed on its exposed surface before the moisture has been entirely evaporated therefrom and that complete evaporation is thereby retarded, if not effectually prevented.

The main object of my invention is the economic production of a better and more uniform product by effectually and equally subjecting all portions of the milk or milk-like substance to rapid evaporating influences and, in effect, to prevent the formation of a hard surface on the material treated.

Broadly stated, my process consists in heating the milk in a comparatively thin layer to evaporate the water and simultaneously subjecting it to a grinding action, so that all portions of the solid constituents of the milk will be thoroughly worked and equally exposed to the action of the heat for vaporizing the water. In carrying out my process the milk is poured or fed to or upon a surface which is heated above the boiling-point of water, and while upon said heated surface it is subjected to a grinding action, preferably by means of another heated surface which is brought in contact therewith and moved relatively thereto. The milk is quickly concentrated by the vaporizing heat and soon changes from a liquid to a semi-liquid or pasty form and then to a dry powdered form. The continuous grinding action causes all of the solid constituents of the milk to be thoroughly worked or kneaded during the drying process and to be thereafter ground into powdered form as the stage of complete dryness is approached. The heat employed should be between 212° and 270° Fahrenheit.

My process is in the best practice, made continuous by means of suitable apparatus to be hereinafter described in which the milk is continuously fed to a highly-heated moving or revolving surface; but it is not necessarily fed thereto in the form of a thin film, as in the prior process hereinbefore referred to; and for this reason a greater quantity of milk may be treated in a given time upon a given area of heated surface than is possible in the prior method referred to.

In the accompanying drawings I have illustrated a machine which may be used for continuously carrying out my process; but it is to be distinctly understood that said process is not dependent upon any particular form of apparatus.

Figure 2:
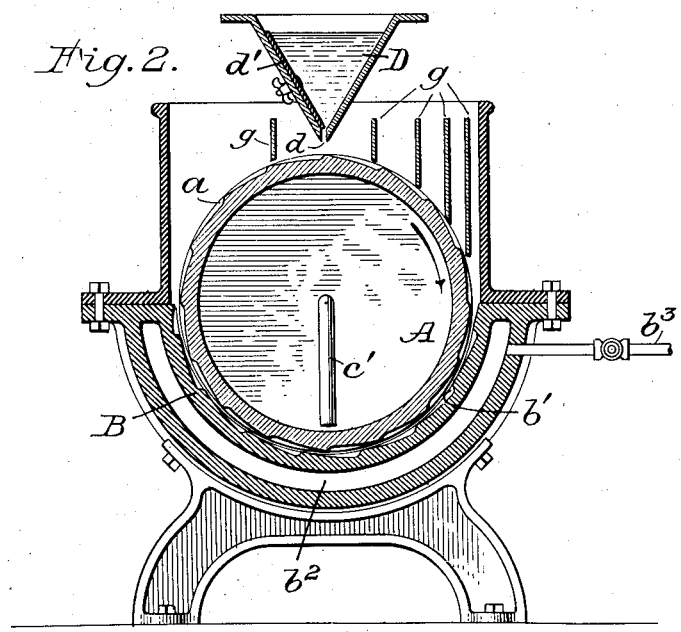

In said drawings, Figure 1 is a central vertical longitudinal section, and Fig. 2 a vertical cross-section, of the machine referred to.

A represents a hollow cone which is rotatably mounted in a concave B, the inner surface of the latter conforming and being in close proximity with the surface of the hollow cone, said concave being closed at its larger end by a wall $b$ and open at its smaller end, as clearly shown in Fig. 1. The surface of the cone is spirally grooved or corrugated, as shown at $a$, and the adjacent surface of the concave is similarly corrugated, as at $b'$, but in an opposite direction to the corrugations on the surface of the cone, as is common in grinding-mills, so that when the cone is revolved the solid constituents of the milk will be kneaded and ground between the two surfaces and gradually carried or pushed by the corrugated surface of the cone to the smaller or discharge end of the machine.

The cone is preferably heated by steam to a temperature above the boiling-point of water, the steam entering the interior of the cone by way of a pipe $c$ and being discharged, together with the water of condensation, by way of a pipe $c'$. I prefer also to heat the grinding-surface of the concave B, and for this purpose said concave is jacketed to afford a steam-space $b^2$, which is provided with suitable inlet and discharge pipes $b^3$ and $b^4$, as clearly shown.

Above the cylinder is a hopper D, from which the milk is fed in a continuous stream to the heated surface of the cone at or near the larger end thereof, said hopper being provided with a discharge-aperture $d$, which may be increased or diminished in size by a slide $d'$ for regulating the flow of milk therefrom, as will be readily understood.

In the operation of the apparatus the quantity of milk fed to the machine will depend upon the diameter and length of the cone A. Said cone may be revolved in any suitable manner—as, for instance, by means of a pulley $e$, connected by a belt to a suitable source of power. The cone is revolved in the direction indicated by the arrow in Fig. 2, and as milk is fed thereto from the hopper D the main bulk of the water is quickly vaporized by the heat from the cone, the solid constituents of the milk, together with the remaining moisture, being carried by the cone into contact with the corrugated surface of the concave B. The material under treatment rapidly assumes a putty-like consistency and as the cone is revolved is worked or kneaded between the heated corrugated surfaces of the cone and concave. As the spiral corrugations on the two surfaces run in opposite directions, the material is pushed or forced toward the smaller end of the concave, and as it approaches complete dryness it is ground between said surfaces and finally discharged from the machine into a suitable receptacle F in a dry powdered form.

A brush G is arranged in contact with the cone between the feed-hopper and the discharge end of the apparatus for releasing such of the material under treatment as may adhere to the grinding-surface of the cone. It is also desirable to provide the apparatus with a series of dashboards $g$ to receive such of the milk as may splash from the cone as the milk is being fed from the hopper and direct it back on the cone.

Having described my process, what I claim as new, and desire to secure by Letters Patent, is—

1. The herein-described process of treating milk to reduce the same to a dry form for better preservation, which process consists in heating the milk in a comparatively thin layer to evaporate the water, and subjecting it to a kneading, which gradually merges into a grinding action as the milk solidifies, to form a powder.

2. The herein-described process of treating milk to reduce it to a dry form, which process consists in feeding the milk to or upon a surface which is heated above the boiling-point of water so as to form it into a comparatively thin layer upon said surface, and subjecting it to a kneading, which gradually merges into a grinding action as the milk solidifies, to form a powder.

3. The herein-described process of treating milk for reducing it to a dry form, which process consists in forming the milk into a comparatively thin layer by feeding it to or upon a continuously-moving surface, heating it to evaporate the water, and simultaneously subjecting it to a kneading, which gradually changes to a grinding action, as the milk solidifies, to form a powder.

In testimony whereof I have hereunto set my hand in presence of two subscribing witnesses.

LOUIS GATHMANN.

Witnesses:
C. W. FOWLER,
A. E. POWELL,